(12) United States Patent
Prathipati et al.

(10) Patent No.: US 12,377,984 B2
(45) Date of Patent: Aug. 5, 2025

(54) ECONOMY SEAT TO FULL BED

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 202 days.

(21) Appl. No.: 18/218,324

(22) Filed: Jul. 5, 2023

(65) Prior Publication Data

US 2024/0343395 A1 Oct. 17, 2024

(30) Foreign Application Priority Data

Apr. 11, 2023 (IN) .............................. 202311026865

(51) Int. Cl.
*B60N 2/427* (2006.01)
*B64D 11/06* (2006.01)

(52) U.S. Cl.
CPC ............................... *B64D 11/0641* (2014.12)

(58) Field of Classification Search
CPC ............. B64D 11/0641; B64D 11/064; B64D 11/0601; B64D 11/0643; B60N 2/34
See application file for complete search history.

(56) References Cited

U.S. PATENT DOCUMENTS

| | | | |
|---|---|---|---|
| 2,796,111 A * | 6/1957 | Janczyszyn | B60N 2/34 5/118 |
| 5,333,818 A | 8/1994 | Brandt et al. | |
| 8,226,163 B1 * | 7/2012 | Pearson | B64D 11/0696 296/68.1 |
| 9,919,803 B2 | 3/2018 | Pozzi et al. | |
| 11,008,105 B2 * | 5/2021 | Ng | B64D 11/06395 |
| 11,059,589 B2 * | 7/2021 | Oleson | B64D 11/0601 |
| 12,071,245 B2 * | 8/2024 | Koustubhan | B64D 11/0627 |
| 12,187,437 B2 * | 1/2025 | Kodati | B64D 11/0641 |
| 2001/0000639 A1 * | 5/2001 | Park | B60N 2/79 297/411.3 |
| 2010/0176633 A1 | 7/2010 | Brncick et al. | |
| 2012/0200125 A1 * | 8/2012 | Achilles | B64D 11/0641 297/233 |
| 2016/0325838 A1 * | 11/2016 | Erhel | B60N 2/34 |
| 2020/0277059 A1 * | 9/2020 | Ng | B64D 11/064 |

FOREIGN PATENT DOCUMENTS

| | | |
|---|---|---|
| CN | 105539853 A | 5/2016 |
| EP | 3078594 A1 | 10/2016 |
| GB | 2563051 A | 12/2018 |
| JP | 5997715 B2 | 9/2016 |
| JP | 6329155 B2 | 5/2018 |

OTHER PUBLICATIONS

European Search Report received in EP Application No. 24169025, Sep. 10, 2024, 8 pages.

\* cited by examiner

*Primary Examiner* — Shin H Kim
(74) *Attorney, Agent, or Firm* — Suiter Swantz IP

(57) ABSTRACT

An economy aircraft seat includes a telescopically extensible seat pan frame. Multiple telescoping sections extend forward with stops to prevent overextension. A forward edge of the extensible seat pan frame includes clips to affix the extensible seat pan frame to a neighboring passenger seat frame. The extensible seat pan frame includes supports that transversely span the extensible seat pan frame.

20 Claims, 16 Drawing Sheets

ECONOMY SEAT TO FULL BED

PRIORITY

The present application claims the benefit under 35 U.S.C. § 119(a) of Indian patent App. No. 202311026865 (filed Apr. 11, 2023), which is incorporated herein by reference.

BACKGROUND

Economy passenger aircraft seating has an option for reclining the seat back to a certain extent. During long haul journeys, leaning back to sleep is insufficient; passengers experience restless sleep only being able to recline slightly. Most passengers would prefer to have a full, flat bed on long-haul journeys.

It would be advantageous to have an economy passenger aircraft seat that extends to a full bed within the existing space.

SUMMARY

In one aspect, embodiments of the inventive concepts disclosed herein are directed to an economy aircraft seat having a telescopically extensible seat pan frame. Multiple telescoping sections extend forward with stops to prevent overextension.

In a further aspect, a forward edge of the extensible seat pan frame includes clips to affix the extensible seat pan frame to a neighboring passenger seat frame.

In a further aspect, the extensible seat pan frame includes supports that transversely span the extensible seat pan frame.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
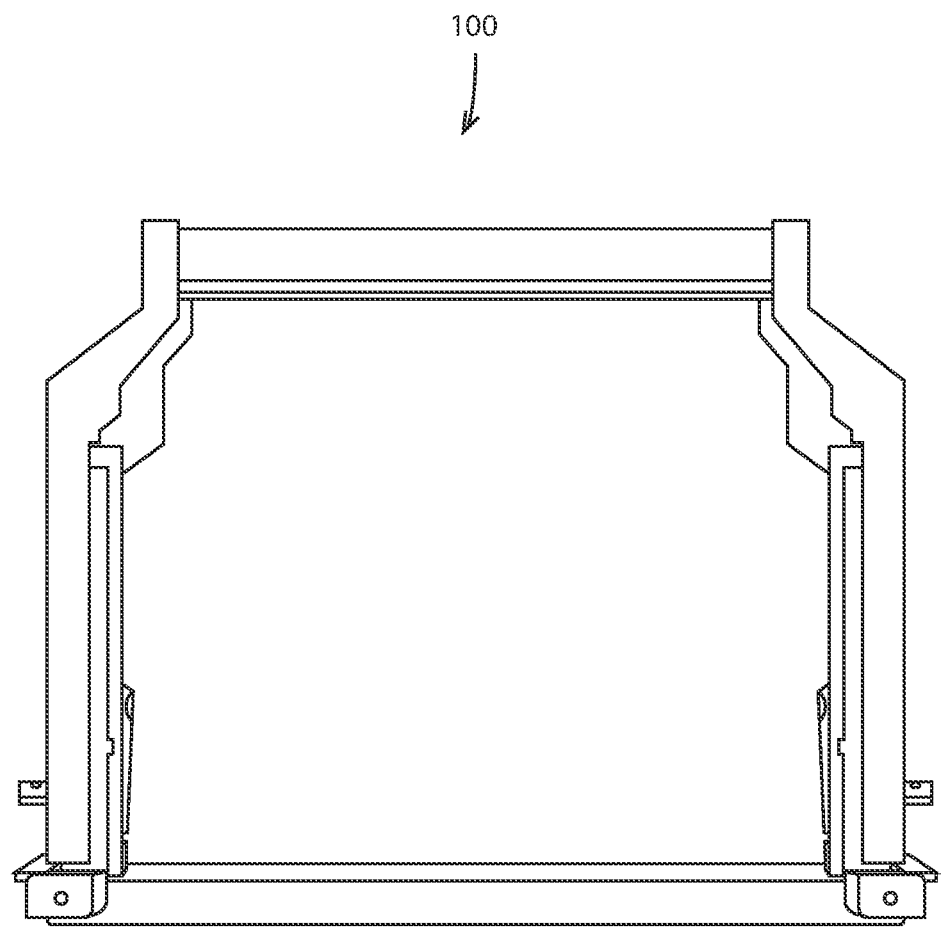
FIG. 1A shows a top view of a seat pan frame according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an economy aircraft seat having a telescopically extensible seat pan frame. Multiple telescoping sections extend forward with stops to prevent overextension. A forward edge of the extensible seat pan frame includes clips to affix the extensible seat pan frame to a neighboring passenger seat frame. The extensible seat pan frame includes supports that transversely span the extensible seat pan frame.

Figure 1B:
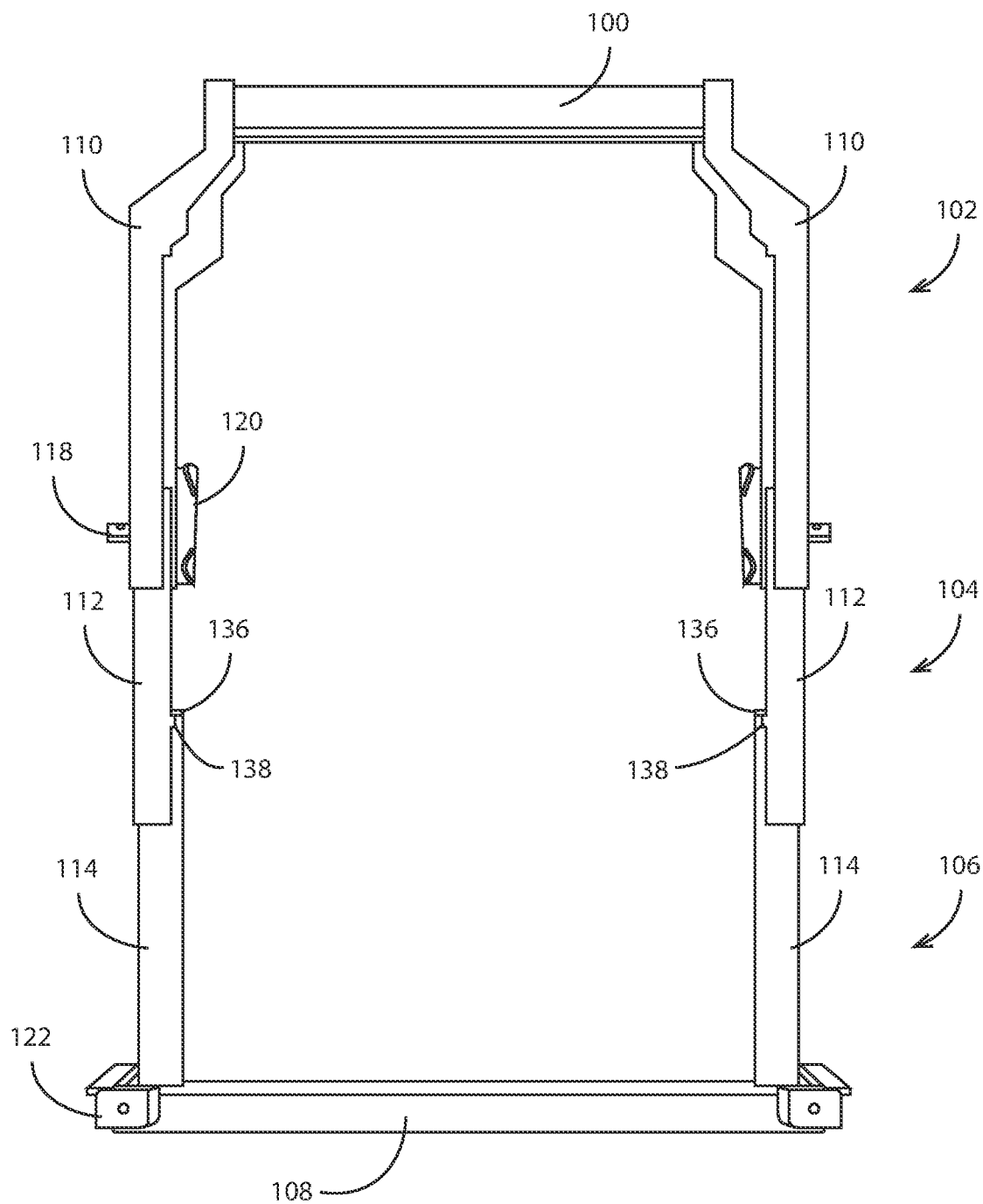
FIG. 1B shows a top view of a seat pan frame according to an exemplary embodiment.

Referring to FIGS. 1A-1B, a top view of a seat pan frame 100 according to an exemplary embodiment are shown. The seat pan frame 100 is configured to transition from a collapsed configuration (as in FIG. 1A) to an extended configuration (as in FIG. 1B). The seat pan frame 100 comprises a first frame portion 102 consisting of two substantially stationary rails 110. The stationary rails 110 are connected by a posterior element 116. A second frame portion 104 consists of two telescoping rails 112 that are configured to translate within the stationary rails 110 of the first frame portion 102. A third frame portion 106 consists of two telescoping rails 114 that are configured to translate within the telescoping rails 112 of the second frame portion 104. The telescoping rails 114 of the third frame portions are connected by an anterior element 108. The anterior element 108 may include attachment features 122 to secure the third frame portion 106 to the frame of another aircraft seat for stability.

In at least one embodiment, one or more of the frame portions 102, 104, 106 may include limiting features 118, 136, 138 to prevent over extension. Furthermore, one or more of the frame portions 102, 104, 106 may include roller guide pockets 120 to facilitate articulation of the seat pan assembly in a collapsed configuration. Seat pan movement is restricted to the length of an existing slot in the longitudinal direction (front to aft of seat).

In at least one embodiment, the first frame portion 110 may include a first limiting feature 118 disposed to engage some element of the second frame portion 112 and prevent the second frame portion 112 from translating beyond a predefined limit. Furthermore, the second frame portion 112 may include a second limiting feature 138 disposed to engage a third limiting feature 136 disposed on the third frame portion 114 when the third frame portion 114 reaches a predefined maximum translation point.

Figure 2A:
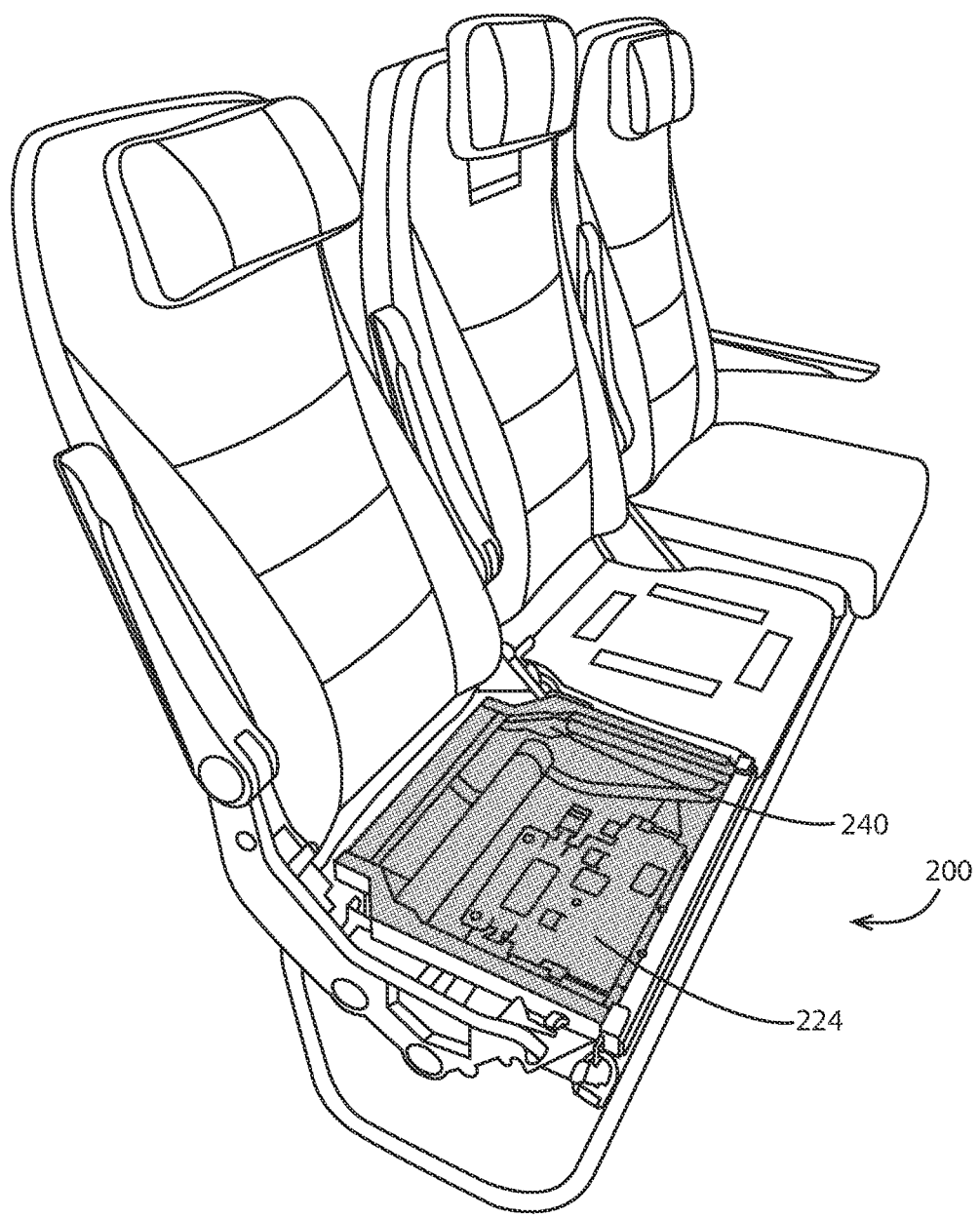
FIG. 2A shows a perspective view of a seat according to an exemplary embodiment.
Figure 2B:
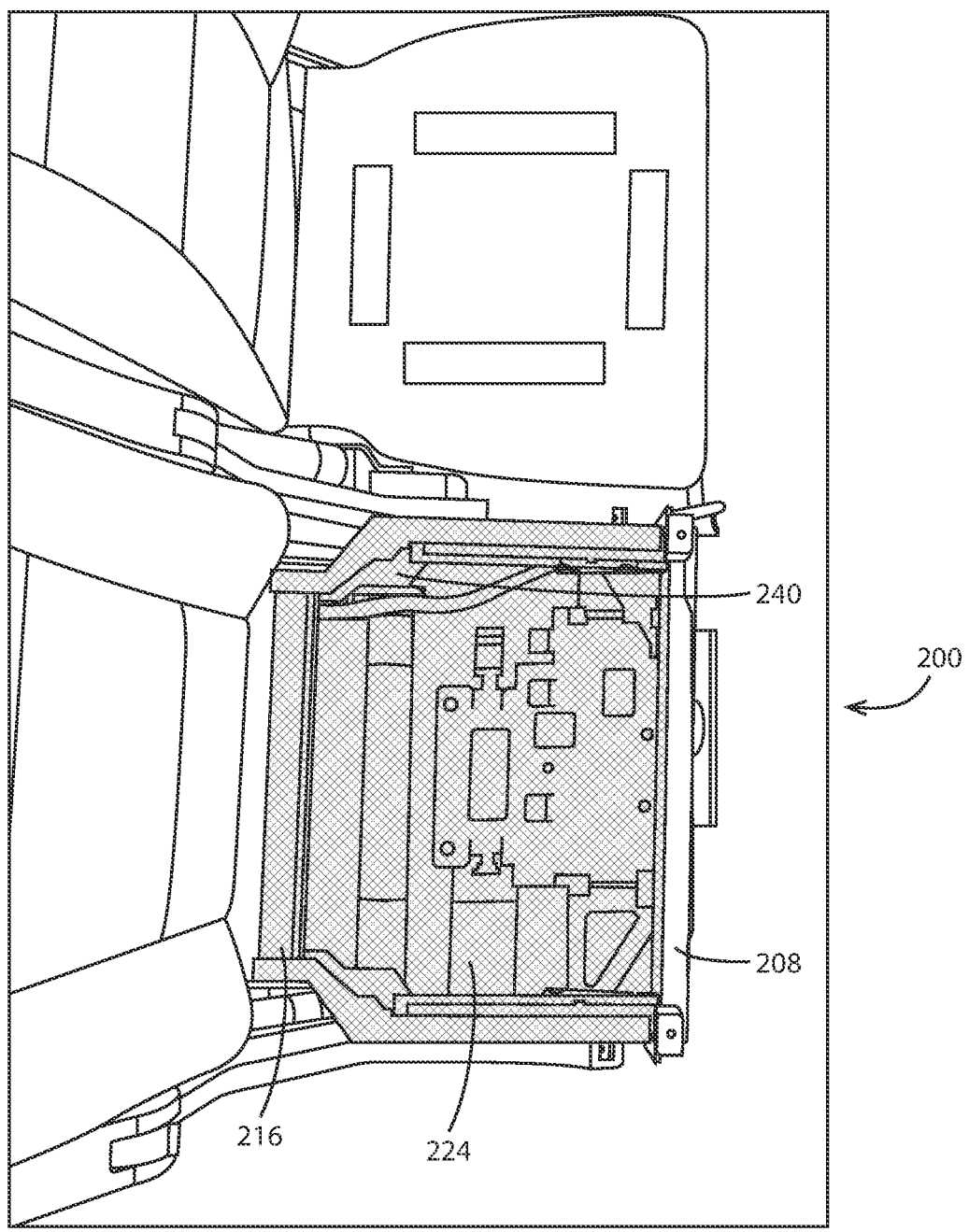
FIG. 2B shows a perspective view of a seat according to an exemplary embodiment.

Referring to FIGS. 2A-2B, a perspective view of a seat according to an exemplary embodiment are shown. In a collapsed configuration, the seat includes a seat pan frame 200 with a posterior element 216 disposed proximal to a seat back and an anterior element 208 disposed distal to the seat back. The seat pan frame 200 may include a mesh or other support 224 connected to the seat pan frame 200 at various points. In at least one embodiment, the support 224 may comprise a set of diaphragms, each separately affixed to a frame portion as described herein. The support 224 provides a surface for a seat cushion as described herein.

In at least one embodiment, the seat may include a roller 240 and roller guide with an extended top face. When the seat pan frame 200 is assembled into the guide ways, a top cap from seat pan frame 200 will cover the guide ways.

Figure 3A:
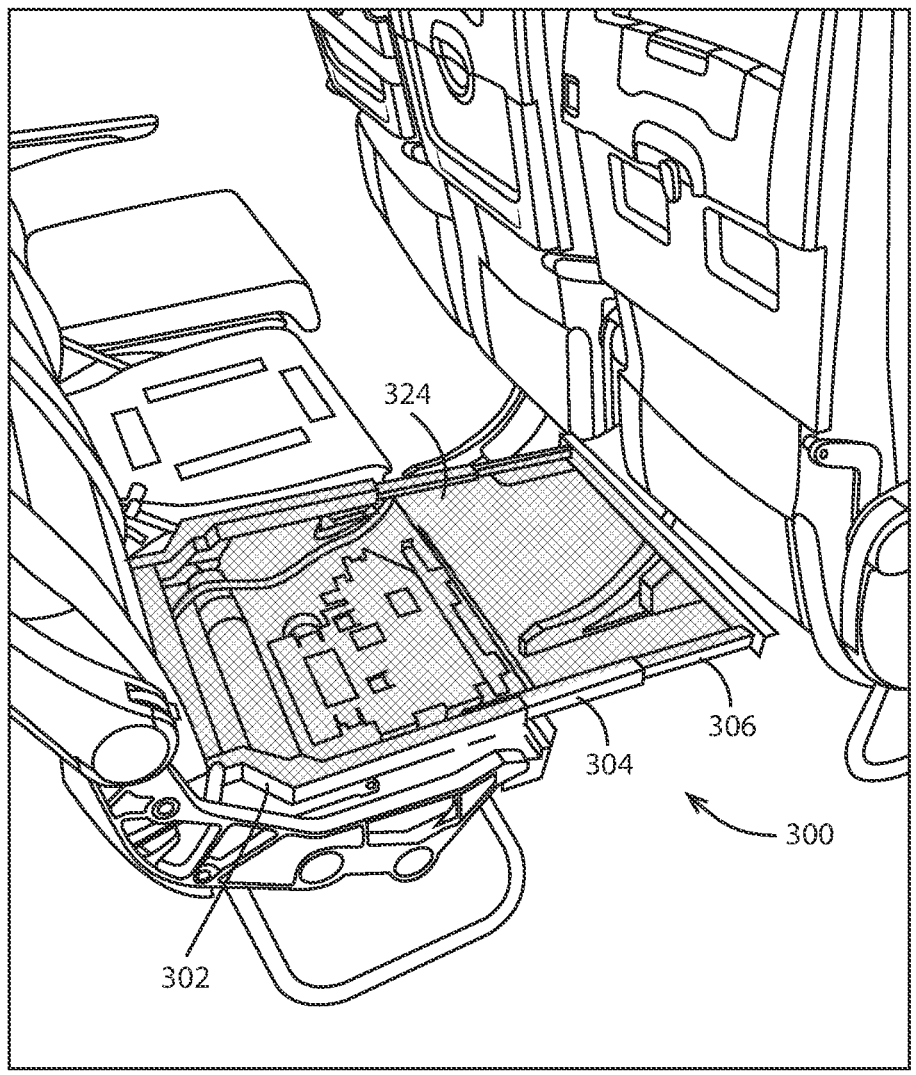
FIG. 3A shows a top, environmental view of a seat pan frame according to an exemplary embodiment.
Figure 3B:
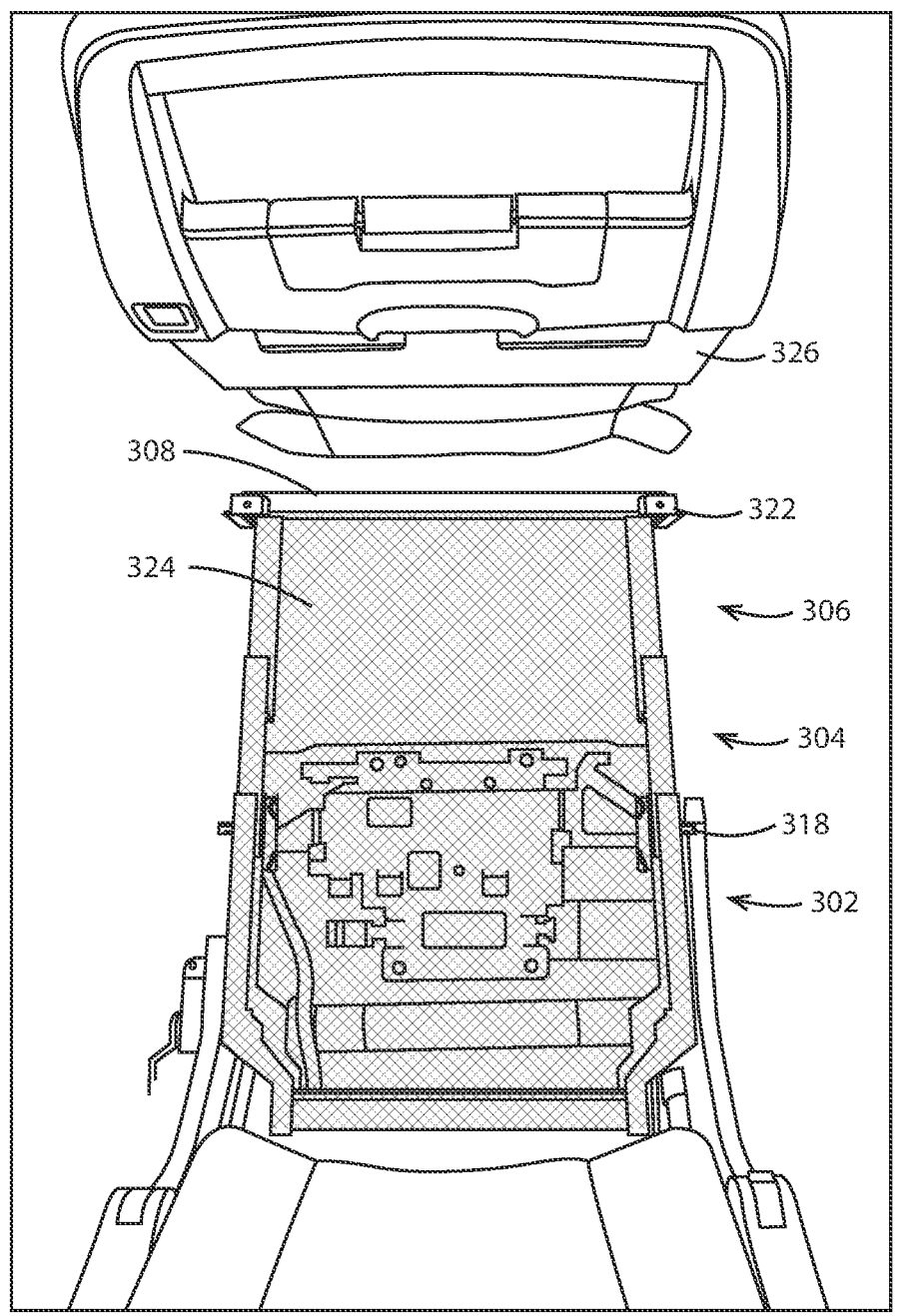
FIG. 3B shows a top, environmental view of a seat pan frame according to an exemplary embodiment.

Referring to FIGS. 3A-3B, a top, environmental view of a seat pan frame 300 according to an exemplary embodiment are shown. In an extended configuration, a second frame portion 304 and third frame portion 306 of a seat pan frame telescopically extend from a substantially stationary first frame portion 302. When in an extended configuration, a support 324 spans the seat pan frame from a posterior element of the first frame portion 302 to an anterior element 308 of the third frame portion 306. The support 324 provides a surface for an elongated seat cushion as described herein.

In at least one embodiment, the support 324 may be affixed to the first frame portion 302 and the third frame portion 306. Alternatively, the support 324 may be affixed to the first frame portion 302, second frame portion 304, and third frame portion 306 at strategic points so as to not interfere with periodic extension and retraction of the second frame portion 304 and third frame portion 306.

When in the elongated configuration, the anterior element 308 is proximal to a neighboring aircraft seat 326. In at least one embodiment, the anterior element 308 may include attachment features 322 to temporarily secure the anterior element 308 (and thereby the third frame portion 306 and the seat pan frame generally) to the neighboring aircraft seat 326. By temporarily securing the anterior element 308 to the neighboring aircraft seat 326, a load on the seat pan frame is distributed.

Figure 4A:
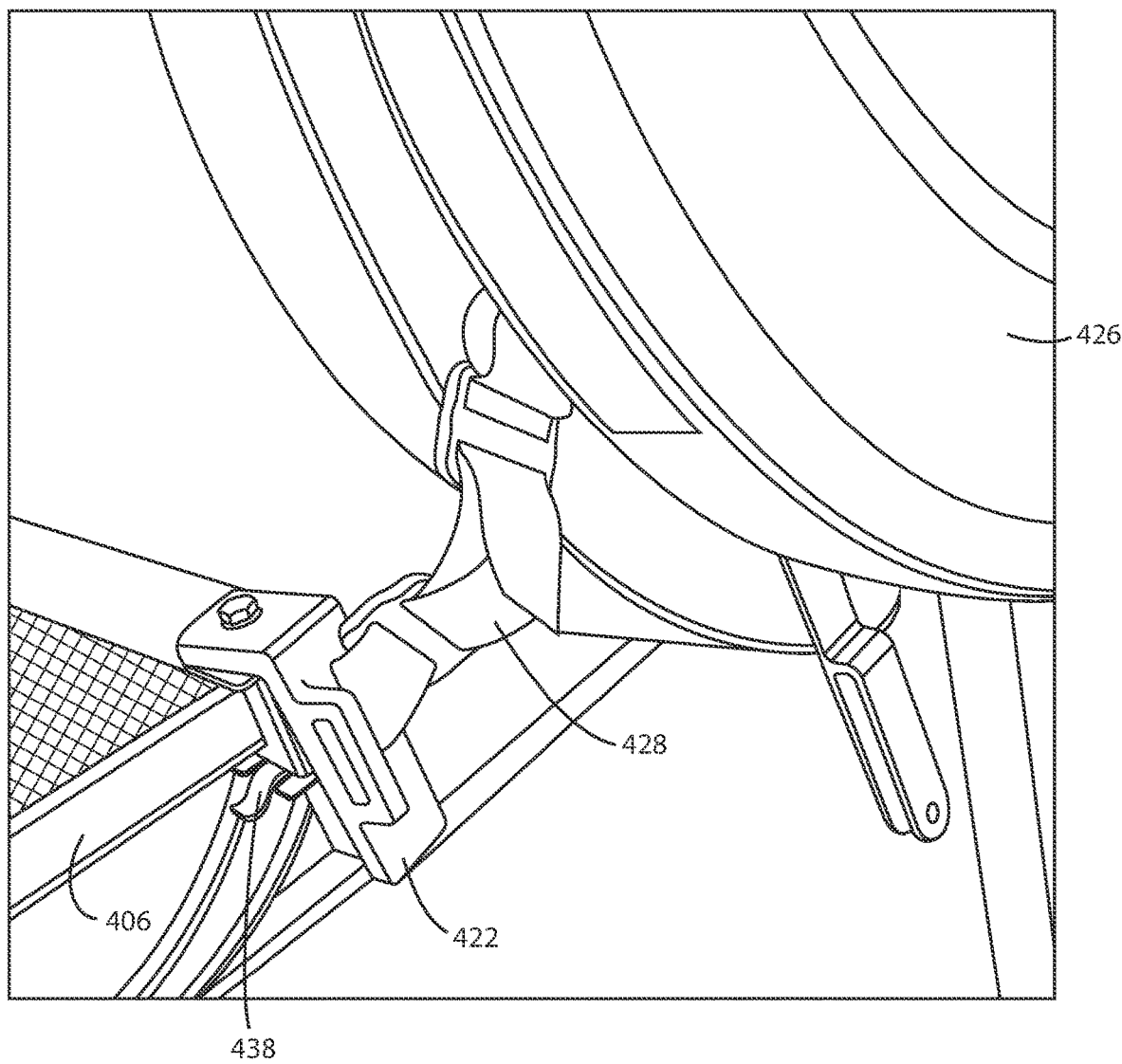
FIG. 4A shows a partial, detail view of an attachment feature according to an exemplary embodiment.
Figure 4B:
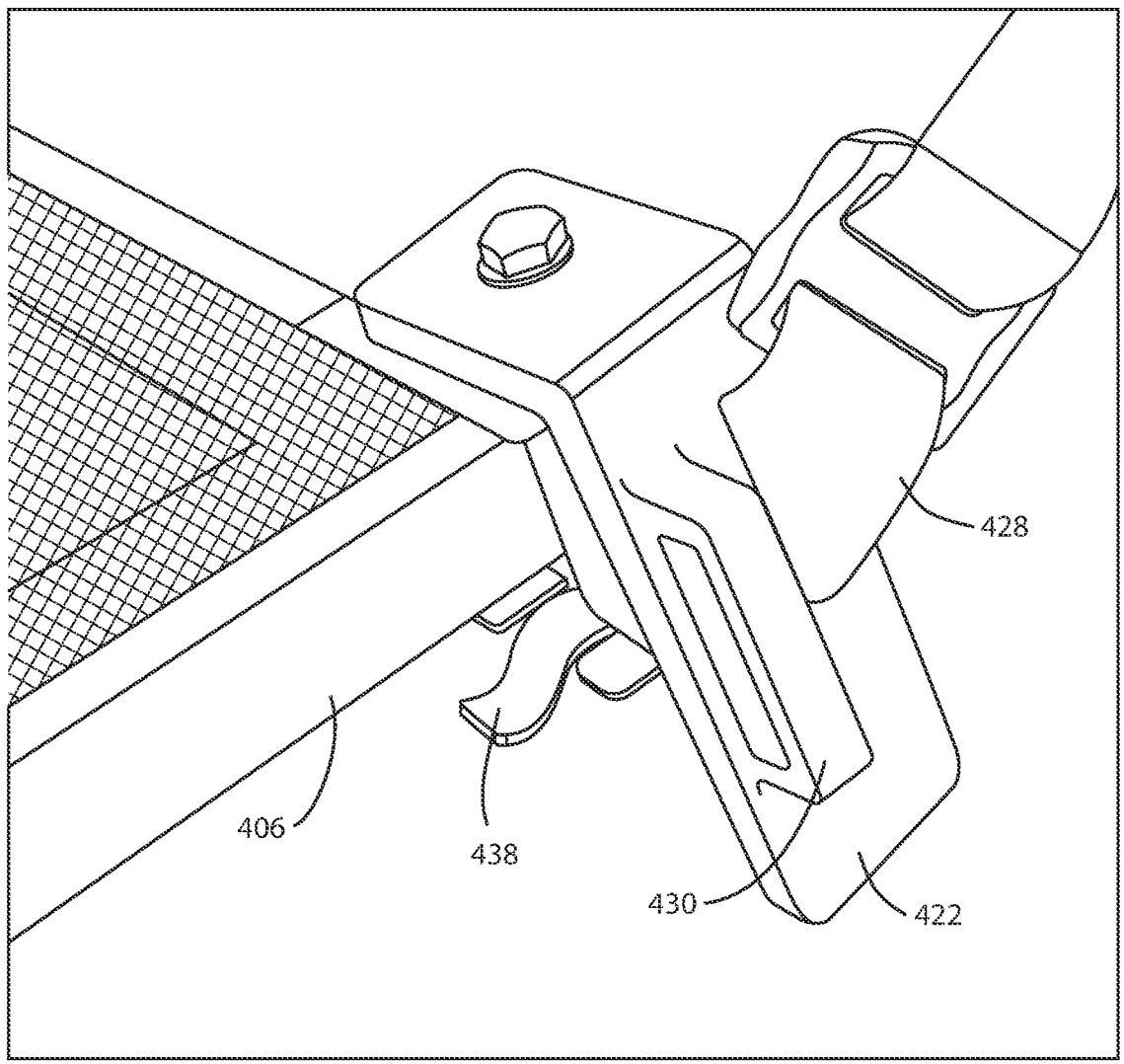
FIG. 4B shows a partial, detail view of an attachment feature according to an exemplary embodiment.

Referring to FIGS. 4A-4B, a partial, detail view of an attachment feature 422 according to an exemplary embodiment are shown. When a seat pan frame according to the present disclosure is in an extended configuration, an attachment feature 422 disposed on a third frame portion 406 is disposed proximal to a neighboring aircraft seat 426. A support strap 428 or other connection feature connects the attachment feature 422 to the neighboring aircraft seat 426.

In at least one embodiment, the support strap 428 may be adapted to engage existing frame structures in the neighboring aircraft seat 426. Alternatively, or in addition, the neighboring seat 426 may include structural attachment points specifically adapted to receive the support strap 428.

In at least one embodiment, the attachment feature 422 may define attachment points 430 specifically configured to receive clips or other engagement features of the support straps 428. Alternatively, the attachment points 430 (and the attachment features 422 generally) may also operate to secure the third frame portion 406 (and thereby the entire seat pan frame) in the collapsed configuration via a releasable connection to some stationary portion of the aircraft seat frame (not shown). A locking mechanism 438 may releasably connect the third frame portion 406 to another portion of the seat pan frame to retain the entire seat frame in the collapsed configuration.

Figure 5:
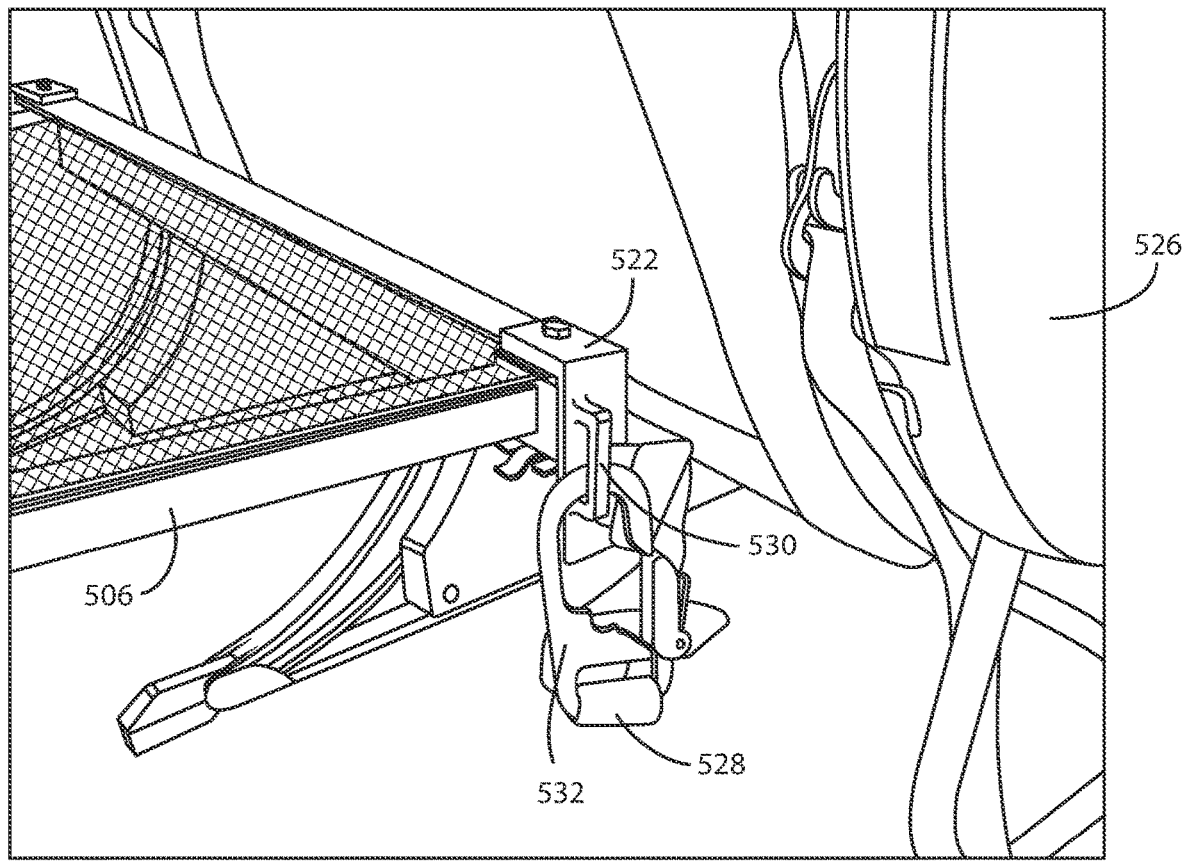
FIG. 5 shows a partial, detail view of an attachment feature according to an exemplary embodiment.
Figure 6A:
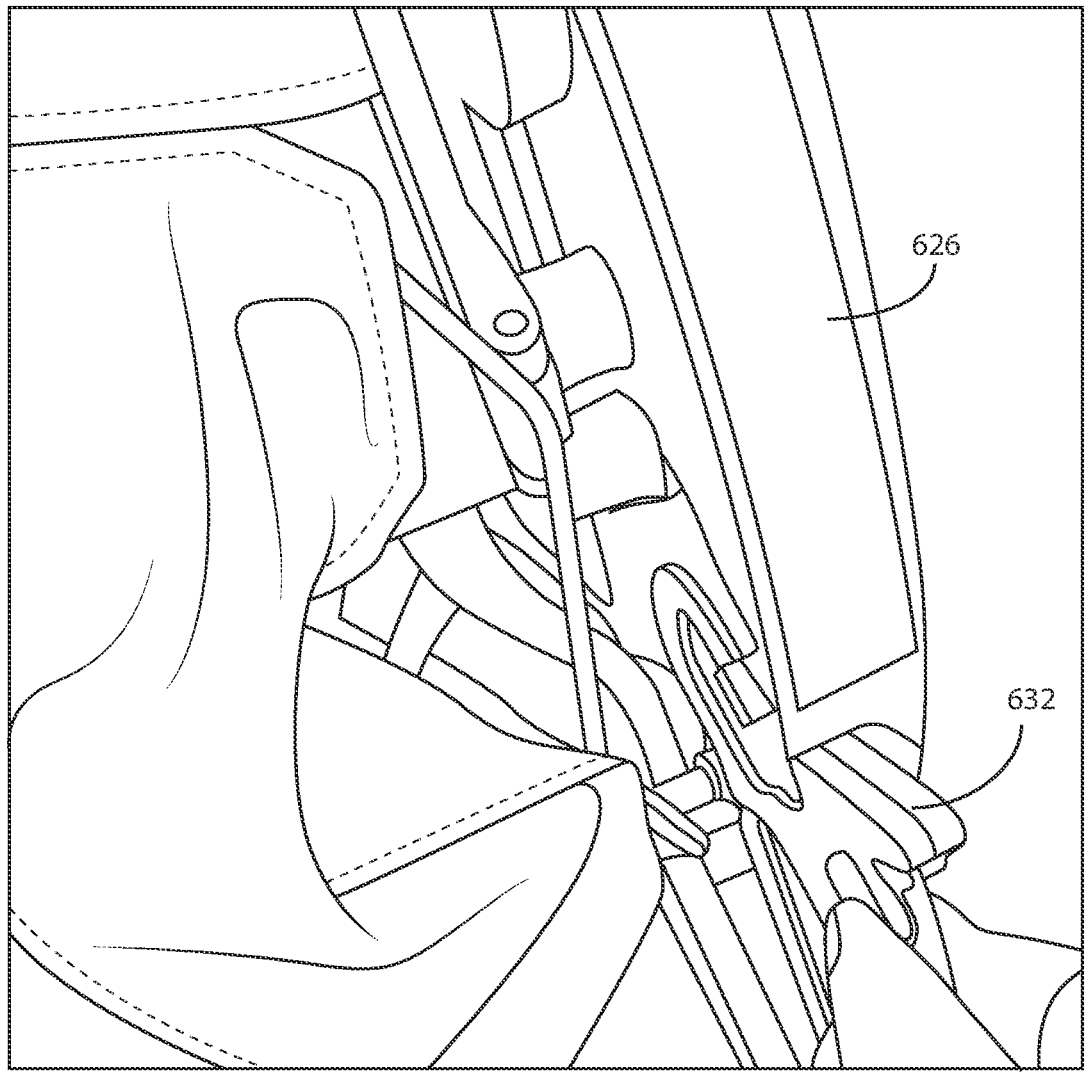
FIG. 6A shows a partial, detail view of a neighboring seat frame according to an exemplary embodiment.
Figure 6B:
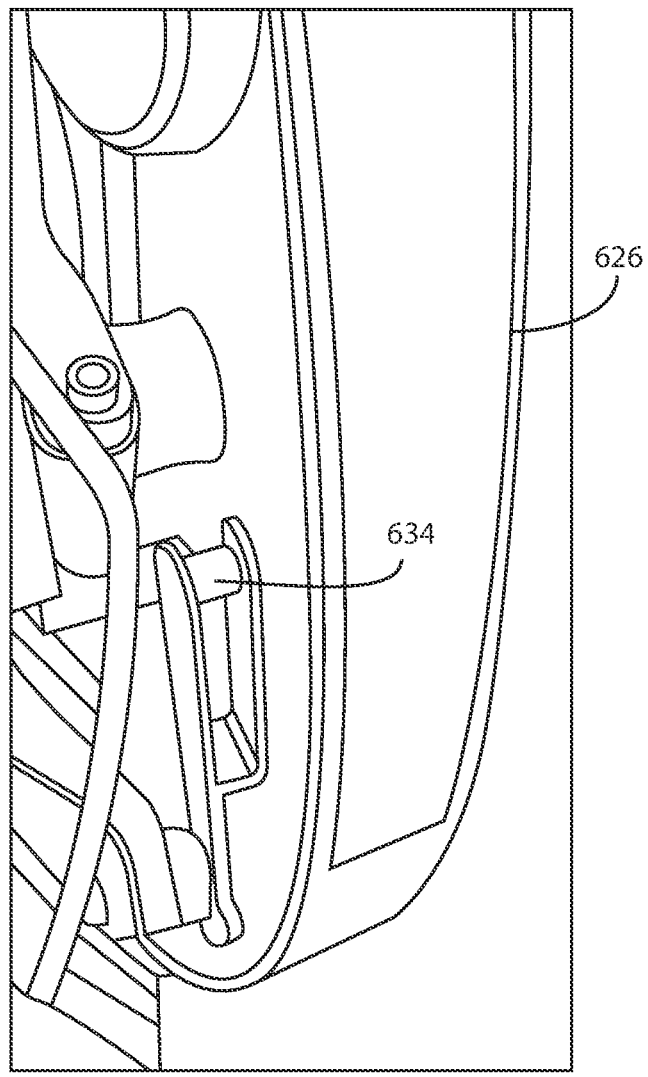
FIG. 6B shows a partial, detail view of a neighboring seat frame according to an exemplary embodiment.
Figure 6C:
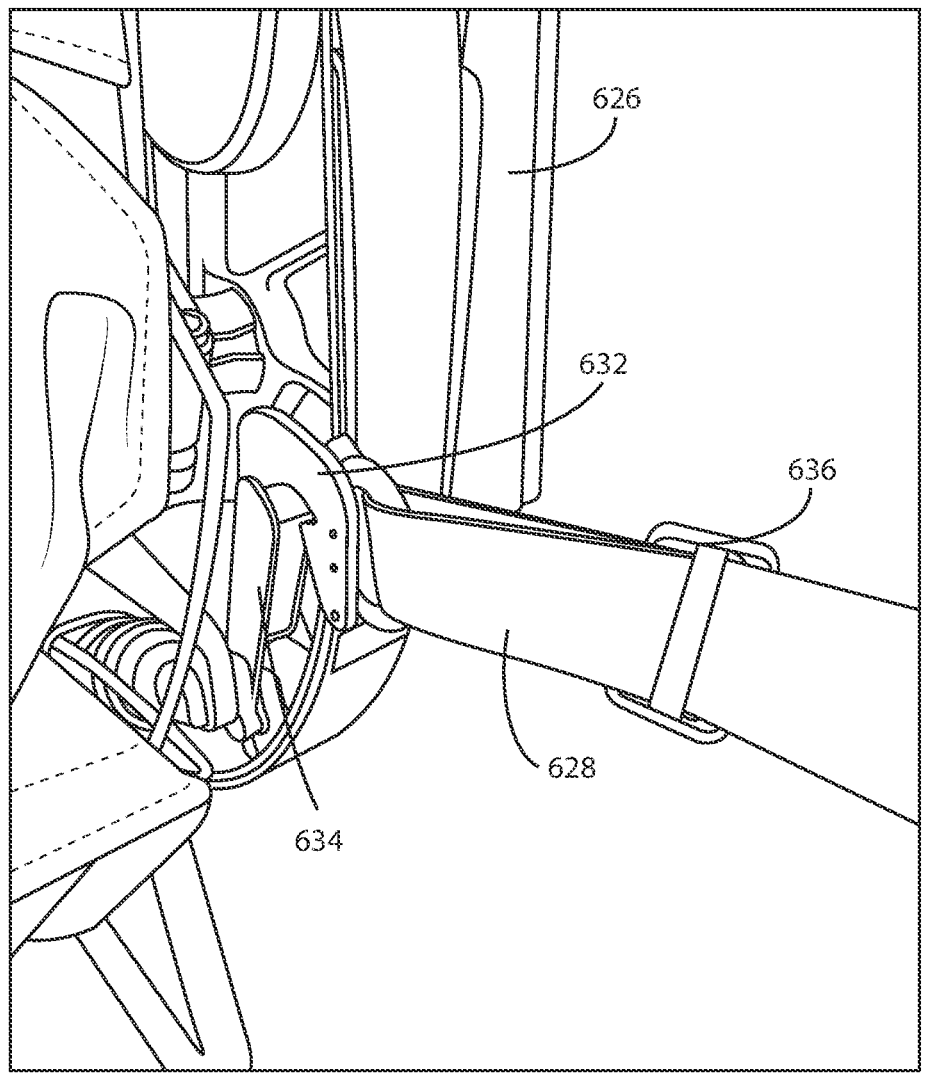
FIG. 6C shows a partial, detail view of a neighboring seat frame according to an exemplary embodiment.
Figure 6D:
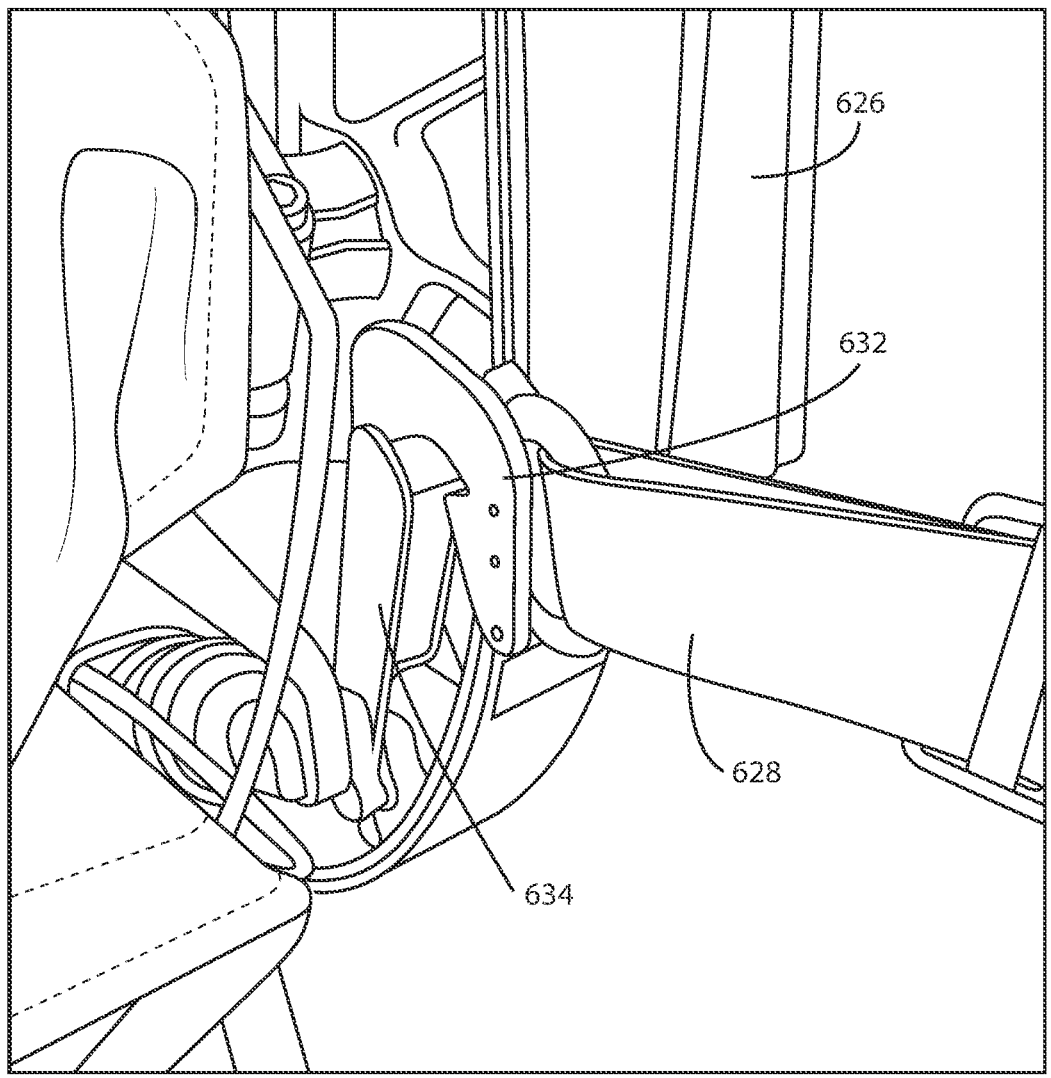
FIG. 6D shows a partial, detail view of a neighboring seat frame according to an exemplary embodiment.

Referring to FIG. 5, a partial, detail view of an attachment feature according to an exemplary embodiment is shown. When a seat pan frame according to the present disclosure is in an extended configuration, an attachment feature 522 disposed on a third frame portion 506 is disposed proximal to a neighboring aircraft seat 526. The attachment feature 522 may define one or more attachment points 530 specifically configured to receive a clip 532 disposed on a support strap 528. In at least one embodiment, the support strap 528 may be permanently affixed to another portion of the attachment feature 522 and releasably connected to the attachment point 530 via the clip 532. While in a collapsed configuration, the attachment point 530 keeps the clip 532 and corresponding support strap 528 in a predefined location, and out of the way of the passenger and the telescoping components of the seat pan frame. In an extended configuration, the clip 532 may be disengaged from the attachment point 530 and engaged to the neighboring seat 526.

Referring to FIGS. 6A-6D, partial, detail views of a neighboring seat frame according to an exemplary embodiment are shown. In a passenger seating system including seats with a seat pan frame according to the present disclosure, there may be neighboring seats 626 disposed in front of such seat pan frame. When in an extended configuration, the seat pan frame may be cantilevered and vulnerable to forces at the distal end of the extended seat pan frame. To counteract such forces, a support strap 628 may connect the distal end of the extended seat pan frame to the neighboring seat 626.

In at least one embodiment, the neighboring seat 626 includes an attachment point 634 that may be mechanically connected to the frame of the neighboring seat 626. The attachment point 634 is specifically adapted to engage a clip 632 disposed on the support strap 628. Alternatively, the clip 632 may be specifically adapted to engage some existing structure in the neighboring seat frame, provided such engagement does not interfere with the neighboring seat 626.

In at least one embodiment, the support strap 628 may include an adjustment element 636 to tighten or loosen the support strap 628 as necessary to support the distal end of the corresponding seat pan frame.

Figure 7A:
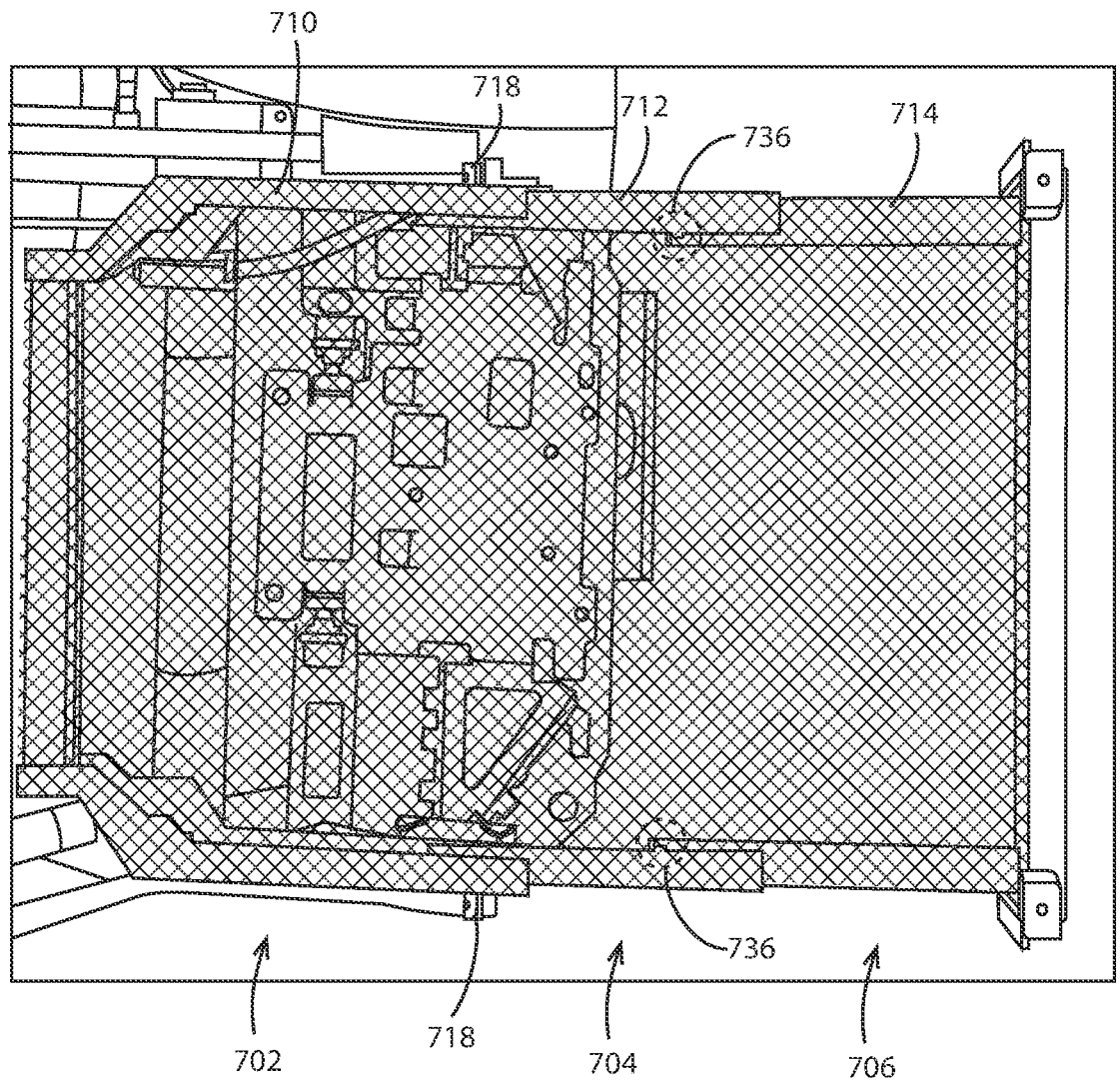
FIG. 7A shows a top view of a seat pan frame according to an exemplary embodiment.
Figure 7B:
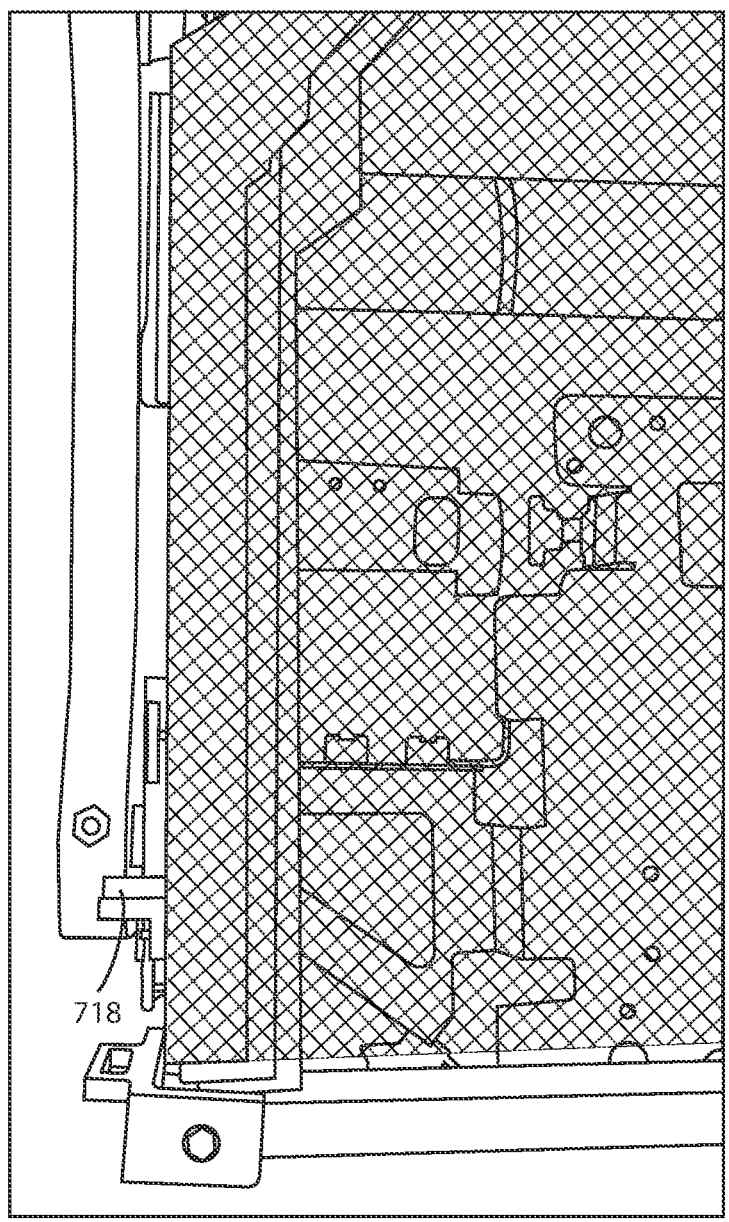
FIG. 7B shows a partial, detail view of a seat pan frame according to an exemplary embodiment.

Referring to FIGS. 7A-7B, a top view and a partial detail of a seat pan frame according to an exemplary embodiment are shown. The seat pan frame is configured to transition from an extended configuration (as in FIG. 7A) to a collapsed configuration (as in FIG. 7B). The seat pan frame comprises a first frame portion consisting of two substantially stationary rails 710, a second frame portion consists of two telescoping rails 712 that are configured to translate within the stationary rails 710 of the first frame portion, and a third frame portion consists of two telescoping rails 714 that are configured to translate within the telescoping rails 712 of the second frame portion. In at least one embodiment, one or more of the frame portions 702, 704, 706 may include limiting features 718, 736 to prevent over extension. The first frame portion rails 710 may include a first limiting feature 718 disposed to engage some element of the second frame portion rails 712 and prevent the second frame portion from translating beyond a predefined limit. For example, the first limiting feature 718 may extend through the first frame portion rail 710 to engage some element of the second frame portion rail 712.

Furthermore, the second frame portion rails 712 may include a second limiting feature 736 disposed to engage a third limiting feature disposed on the third frame portion rails 714 when the third frame portion reaches a predefined maximum translation point.

It may be appreciated that the limiting features 718, 736 may be configured to avoid existing seat frame structures. For example, the limiting features 718, 736 may disposed internally to the seat pan frame where possible, or configured to protrude less than existing tolerance between the seat pan frame and an aisle bumper.

In at least one embodiment, the seat pan frame may include full length stiffeners to each of the first frame portion, second frame portion, and third frame portion. Such stiffeners provide structure to the diaphragm and reduce swag during the long usage, prevent interference between multiple supports, each attached to a frame portion, and facilitates smooth extension and stowage of the seat pan frame.

Figure 8:
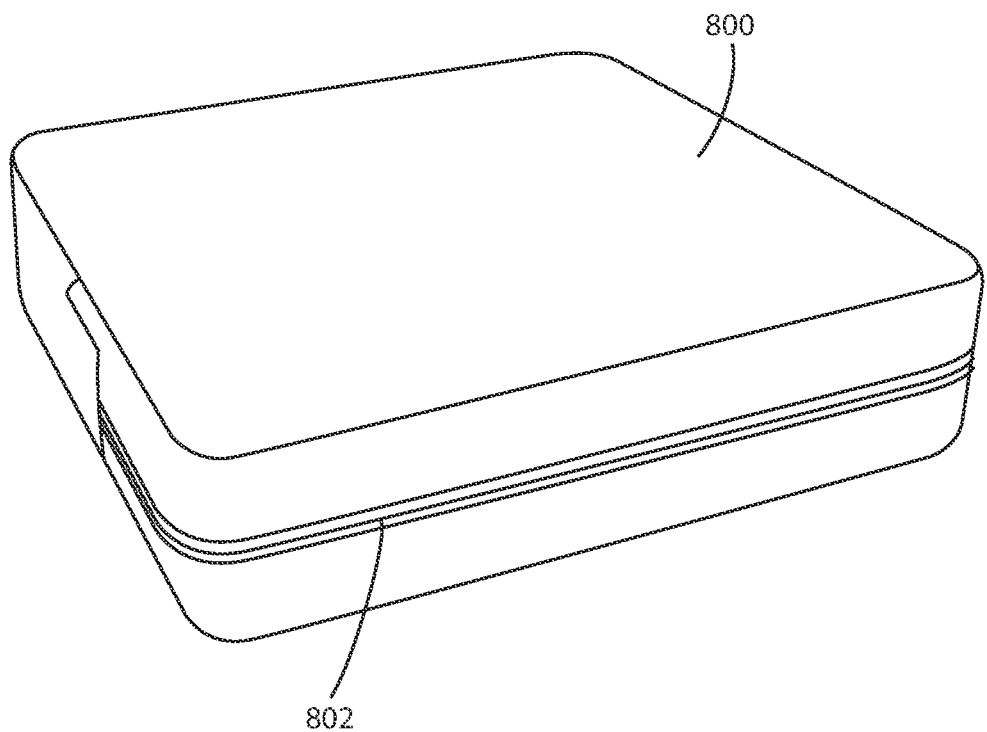
FIG. 8 shows a perspective view of a seat cushion according to an exemplary embodiment.

Referring to FIG. 8, a perspective view of a seat cushion 800 according to an exemplary embodiment is shown. When a seat pan frame is in a collapsed configuration, the seat cushion may be folded over and potentially zipped via a zipper 802 into a standard sized aircraft seat cushion. When the seat pan frame is in an extended configuration, the cushion 800 may be unzipped on three sides. The top half may be flipped onto the extension while the bottom half remains on the seat pan frame. In at least one embodiment, the bottom half may include hook-and-loop fabric to keep the cushion 800 in a predefined location.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An aircraft seat frame comprising:
   a first seat pan frame portion comprising stationary rails;
   a second seat pan frame portion comprising rails configured to translatably engage the stationary rails of the first seat pan portion; and
   a third seat pan frame portion comprising rails configured to translatably engage the rails of the second seat pan frame,
   wherein the first seat pan frame portion, second seat pan frame portions, and third seat pan frame portion are configured to translate from a collapsed configuration where the first seat pan frame portion, second seat pan frame portions, and third seat pan frame portion are nested together, to an extended configuration where the first seat pan frame portion, second seat pan frame portions, and third seat pan frame portion are telescopically extended.

2. The aircraft seat frame of claim 1, further comprising a locking mechanism disposed on the third seat pan frame portion, configured to releasably engage a stationary portion of the aircraft seat frame when in the collapsed configuration.

3. The aircraft seat frame of claim 1, wherein the third seat pan frame portion further comprises a securing element disposed to engage a neighboring aircraft seat.

4. The aircraft seat frame of claim 3, wherein the securing element further comprises an attachment element and a support strap affixed to the attachment element.

5. The aircraft seat frame of claim 4, wherein:
   the securing element comprises a clip disposed on the support strap; and
   the attachment element comprises at least one attachment point configured to receive the clip in the collapsed configuration.

6. The aircraft seat frame of claim 1, wherein the first seat pan frame portion comprises a first limiting element configured and disposed to engage the second frame portion when in the extended configuration.

7. The aircraft seat frame of claim 6, wherein:
   the second seat pan frame portion comprises a second limiting element;
   the third seat pan frame portion comprises a third limiting element; and the second limiting element is configured and disposed to engage the third limiting element when in the extended configuration.

8. An aircraft seat comprising:
an extendable seat pan frame comprising:
a first seat pan frame portion comprising stationary rails;
a second seat pan frame portion comprising rails configured to translatably engage the stationary rails of the first seat pan portion; and
a third seat pan frame portion comprising rails configured to translatably engage the rails of the second seat pan frame,
wherein the first seat pan frame portion, second seat pan frame portions, and third seat pan frame portion are configured to translate from a collapsed configuration where the first seat pan frame portion, second seat pan frame portions, and third seat pan frame portion are nested together, to an extended configuration where the first seat pan frame portion, second seat pan frame portions, and third seat pan frame portion are telescopically extended.

9. The aircraft seat of claim 8, further comprising a plurality of support diaphragms, each disposed on a seat pan frame portion to provide support for a cushion.

10. The aircraft seat of claim 9, further comprising a seat cushion comprising a top portion and a bottom portion releasable connected by a zipper on three sides, configured to split and cover the extendable seat pan frame when in the extended configuration.

11. The aircraft seat of claim 8, wherein the third seat pan frame portion further comprises a securing element disposed to engage a neighboring aircraft seat.

12. The aircraft seat of claim 11, wherein:
the securing element further comprises:
an attachment element;
a support strap affixed to the attachment element; and
a clip disposed on the support strap; and
the attachment element comprises at least one attachment point configured to receive the clip in the collapsed configuration.

13. The aircraft seat of claim 8, wherein the first seat pan frame portion comprises a first limiting element configured and disposed to engage the second frame portion when in the extended configuration.

14. The aircraft seat of claim 13, wherein:
the second seat pan frame portion comprises a second limiting element;
the third seat pan frame portion comprises a third limiting element; and
the second limiting element is configured and disposed to engage the third limiting element when in the extended configuration.

15. A passenger seating system comprising:
an extendable seat pan frame comprising:
a first seat pan frame portion comprising stationary rails;
a second seat pan frame portion comprising rails configured to translatably engage the stationary rails of the first seat pan portion; and
a third seat pan frame portion comprising rails configured to translatably engage the rails of the second seat pan frame,
wherein the first seat pan frame portion, second seat pan frame portions, and third seat pan frame portion are configured to translate from a collapsed configuration where the first seat pan frame portion, second seat pan frame portions, and third seat pan frame portion are nested together, to an extended configuration where the first seat pan frame portion, second seat pan frame portions, and third seat pan frame portion are telescopically extended.

16. The system of claim 15, further comprising a plurality of support diaphragms, each disposed on a seat pan frame portion to provide support for a cushion.

17. The system of claim 16, further comprising a seat cushion comprising a top portion and a bottom portion releasable connected by a zipper on three sides, configured to split and cover the extendable seat pan frame when in the extended configuration.

18. The system of claim 15, further comprising:
a securing element disposed on the third seat pan frame portion, comprising:
an attachment element;
a support strap affixed to the attachment element; and
a clip disposed on the support strap; and
an attachment point disposed on a neighboring aircraft seat frame, configured to receive the clip when in the extended configuration.

19. The system of claim 15, wherein the first seat pan frame portion comprises a first limiting element configured and disposed to engage the second frame portion when in the extended configuration.

20. The system of claim 19, wherein:
the second seat pan frame portion comprises a second limiting element;
the third seat pan frame portion comprises a third limiting element; and
the second limiting element is configured and disposed to engage the third limiting element when in the extended configuration.

* * * * *